United States Patent
Yoda

(10) Patent No.: US 9,244,092 B2
(45) Date of Patent: Jan. 26, 2016

(54) PHYSICAL QUANTITY SENSOR AND ELECTRONIC APPARATUS

(71) Applicant: Seiko Epson Corporation, Tokyo (JP)

(72) Inventor: Mitsuhiro Yoda, Sakai (JP)

(73) Assignee: Seiko Epson Corporation (JP)

( * ) Notice: Subject to any disclaimer, the term of this patent is extended or adjusted under 35 U.S.C. 154(b) by 376 days.

(21) Appl. No.: 13/749,042

(22) Filed: Jan. 24, 2013

(65) Prior Publication Data

US 2013/0192370 A1 Aug. 1, 2013

(30) Foreign Application Priority Data

Jan. 30, 2012 (JP) .................................. 2012-016240

(51) Int. Cl.
*G01P 15/02* (2013.01)
*G01P 15/08* (2006.01)
*G01P 15/125* (2006.01)

(52) U.S. Cl.
CPC .............. *G01P 15/02* (2013.01); *G01P 15/0802* (2013.01); *G01P 15/125* (2013.01); *G01P 2015/0831* (2013.01); *G01P 2015/0871* (2013.01)

(58) Field of Classification Search
None
See application file for complete search history.

(56) References Cited

U.S. PATENT DOCUMENTS

| | | | |
|---|---|---|---|
| 5,404,749 A | 4/1995 | Spangler | |
| 5,488,864 A | 2/1996 | Stephan | |
| 5,905,203 A | 5/1999 | Flach et al. | |
| 6,513,380 B2 | 2/2003 | Reeds, III et al. | |
| 7,121,141 B2 | 10/2006 | McNeil | |
| 8,079,262 B2 | 12/2011 | Guo | |
| 2005/0217377 A1* | 10/2005 | Ao | 73/510 |
| 2006/0112766 A1* | 6/2006 | Ohta | 73/526 |
| 2008/0216572 A1* | 9/2008 | Aoyama | 73/514.32 |
| 2008/0264167 A1* | 10/2008 | Kandori | G01C 19/5719 73/504.12 |
| 2009/0282915 A1* | 11/2009 | Ohta et al. | 73/504.12 |
| 2011/0138911 A1* | 6/2011 | Oshio | 73/504.12 |
| 2011/0140575 A1* | 6/2011 | Nishizawa | 310/323.21 |
| 2011/0167912 A1* | 7/2011 | Ohta et al. | 73/504.12 |
| 2012/0210789 A1* | 8/2012 | Kanemoto | 73/504.12 |
| 2013/0068019 A1* | 3/2013 | Takase | G01C 19/56 73/504.12 |
| 2013/0081474 A1* | 4/2013 | Ichikawa | 73/658 |
| 2013/0133422 A1* | 5/2013 | Yamanaka et al. | 73/504.03 |
| 2013/0264908 A1* | 10/2013 | Matsuo | 310/312 |

FOREIGN PATENT DOCUMENTS

| | | |
|---|---|---|
| JP | 06-213924 | 8/1994 |
| JP | 06-308152 | 11/1994 |
| JP | 09-189716 | 7/1997 |
| JP | 2007-298405 | 11/2007 |
| JP | 2008-529001 | 7/2008 |
| JP | 2009-109494 | 5/2009 |
| JP | 2009-537803 | 10/2009 |

* cited by examiner

*Primary Examiner* — Andre Allen
(74) *Attorney, Agent, or Firm* — Harness, Dickey & Pierce, P.L.C.

(57) ABSTRACT

A physical quantity sensor includes a substrate, an oscillating member that is disposed over the substrate, support portions that support the oscillating member and that are disposed along a first axis, and detection electrodes that are disposed on the substrate so as to oppose the oscillating member. The oscillating member has a pair of side faces intersecting a second axis perpendicular to the first axis in a plane, and a protrusion is formed on at least one of the pair of side faces.

11 Claims, 8 Drawing Sheets

PHYSICAL QUANTITY SENSOR AND ELECTRONIC APPARATUS

BACKGROUND

1. Technical Field

The present invention relates to a physical quantity sensor and an electronic apparatus.

2. Related Art

Recently, physical quantity sensors such as inertial sensors have been developed which detect a physical quantity, for example, using silicon MEMS (Micro Electro Mechanical System) techniques.

For example, JP-A-2008-529001 discloses a seesaw physical quantity sensor that detects acceleration in a Z axis direction using an oscillating motion (seesaw oscillation). The physical quantity sensor disclosed in JP-A-2008-529001 includes a conductive plate and a proof mass having first and second regions which are different in mass from each other. The proof mass oscillates around an oscillation axis, which partitions the first and second regions, depending on the acceleration in the Z axis direction. The physical quantity sensor disclosed in JP-A-2008-529001 detects the acceleration on the basis of a variation in capacitance between the conductive plate and the proof mass, which results from oscillation of the proof mass.

The physical quantity sensor disclosed in JP-A-2008-529001 includes a protective shield used to limit the oscillation of the proof mass and a stopper protruding to the protective shield. Accordingly, it is possible to prevent the conductive plate and the proof mass from coming in contact with each other, thereby enhancing reliability.

However, in the physical quantity sensor disclosed in JP-A-2008-529001, the stopper has to be formed by depositing and patterning a predetermined material on the proof mass, thereby causing complication of manufacturing processes thereof.

SUMMARY

An advantage of some aspects of the invention is that it provides a physical quantity sensor with high reliability which can simplify manufacturing processes thereof. Another advantage of some aspects of the invention is that it provides an electronic apparatus including the physical quantity sensor.

The invention can be implemented as the following forms or application examples.

Application Example 1

This application example is directed to a physical quantity sensor including: a substrate; an oscillating member that is disposed over the substrate; a support portion that supports the oscillating member and that is disposed along a first axis; and a detection electrode that is disposed on the substrate and that is disposed to oppose the oscillating member, wherein the oscillating member has a pair of side faces intersecting a second axis perpendicular to the first axis in a plane, and wherein a protrusion protruding in the plane is formed on a part of at least one of the pair of side faces.

According to this physical quantity sensor, when a large acceleration is applied thereto, it is possible to prevent the oscillating member from colliding with the substrate. Accordingly, it is possible to prevent damage to the oscillating member, thereby enhancing reliability. Since the protrusion is disposed on the side faces of the oscillating member, the oscillating member and the protrusion can be formed, for example, by patterning a single substrate. As a result, it is possible to simplify the manufacturing processes.

Application Example 2

In the physical quantity sensor according to this application example, the physical quantity sensor may further include an electrode that is disposed outside the arrangement area of the detection electrode on the substrate and that opposes the oscillating member, and the electrode may be electrically connected to the oscillating member.

According to this physical quantity sensor, it is possible to set the oscillating member and the electrode to the same potential, thereby preventing the oscillating member from sticking to the substrate.

Application Example 3

In the physical quantity sensor according to this application example, the protrusion may not overlap with the detection electrode and the electrode when seen in a plan view.

According to this physical quantity sensor, when the protrusion collides with the substrate, it is possible to prevent damage to the detection electrode and the electrode.

Application Example 4

In the physical quantity sensor according to this application example, the planar shape of the protrusion may have a sharp-pointed tip.

According to this physical quantity sensor, it is possible to reduce the contact area of the protrusion and the substrate, thereby preventing the oscillating member (the protrusion) from sticking to the substrate.

Application Example 5

In the physical quantity sensor according to this application example, the planar shape of the protrusion may have an arc-like tip.

According to this physical quantity sensor, it is possible to reduce the contact area of the protrusion and the substrate, thereby preventing the oscillating member (the protrusion) from sticking to the substrate.

Application Example 6

In the physical quantity sensor according to this application example, the protrusion may be formed as a unified body along with the oscillating member.

According to this physical quantity sensor, it is possible to simplify the manufacturing processes thereof.

Application Example 7

In the physical quantity sensor according to this application example, the oscillating member may have a rectangular planar shape and includes a first side face and a second side face intersecting the second axis, and when the first side face is partitioned into a first region and a second region by the second axis passing through the center of the width in the first axis direction of the first side face, the protrusion may be disposed in each of the first region and the second region.

According to this physical quantity sensor, it is possible to more satisfactorily prevent the oscillating member from colliding with the substrate.

Application Example 8

In the physical quantity sensor according to this application example, a frame member may be disposed around the oscillating member, the oscillating member may be connected to the frame member with the support portion therebetween so as to be separated from the frame member, and the width of a gap between the outer edge of the oscillating member and the protrusion and the inner edge of the frame member may be constant.

According to this physical quantity sensor, it is possible to achieve a decrease in size thereof. In processes of bonding a sensor substrate to the substrate and etching the sensor substrate to form the oscillating member, by designing the width of the gap between the outer edge of oscillating member and the protrusion and the inner edge of the frame member to be constant, it is possible to form the oscillating member and the protrusion through the use of a single etching process, thereby enhancing manufacturing efficiency.

Application Example 9

In the physical quantity sensor according to this application example, one region and the other region into which the oscillating member is partitioned by the first axis may be different in mass from each other.

Application Example 10

In the physical quantity sensor according to this application example, the detection electrode may include a first detection electrode that is disposed at a position opposing the one region of the oscillating member and a second detection electrode that is disposed at a position opposing the other region of the oscillating member.

Application Example 11

This application example is directed to an electronic apparatus including the physical quantity sensor according to the above-mentioned application example.

According to this electronic apparatus, since the electronic apparatus includes the physical quantity sensor according to the above-mentioned application examples, it is possible to simplify the manufacturing processes thereof and thus to achieve high reliability.

BRIEF DESCRIPTION OF THE DRAWINGS

The invention will be described with reference to the accompanying drawings, wherein like numbers reference like elements.

DESCRIPTION OF EXEMPLARY EMBODIMENTS

Hereinafter, exemplary embodiments of the invention will be described in detail with reference to the accompanying drawings. The exemplary embodiments to be described below are not intended to unfairly limit the invention. The overall elements and configurations to be described below cannot be said to be essential constituents of the invention.

1. Physical Quantity Sensor

Figure 1:
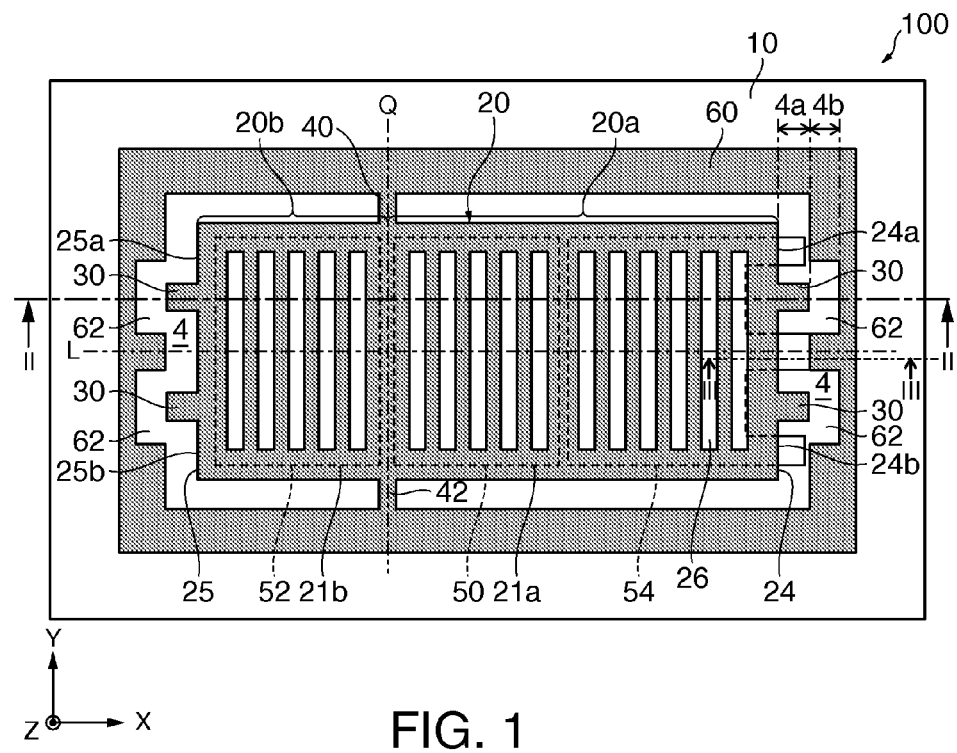
FIG. 1 is a plan view schematically illustrating a physical quantity sensor according to an exemplary embodiment of the invention.
Figure 2:
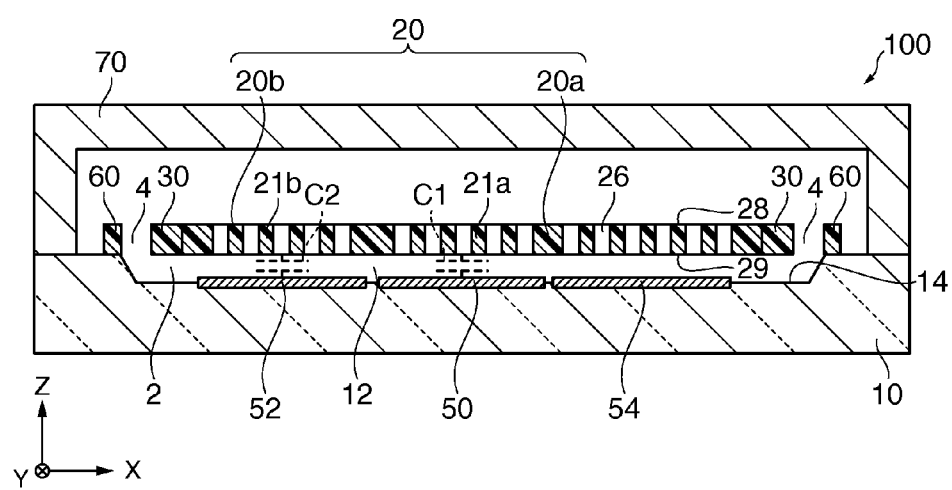
FIG. 2 is a cross-sectional view schematically illustrating the physical quantity sensor according to the exemplary embodiment.
Figure 3:
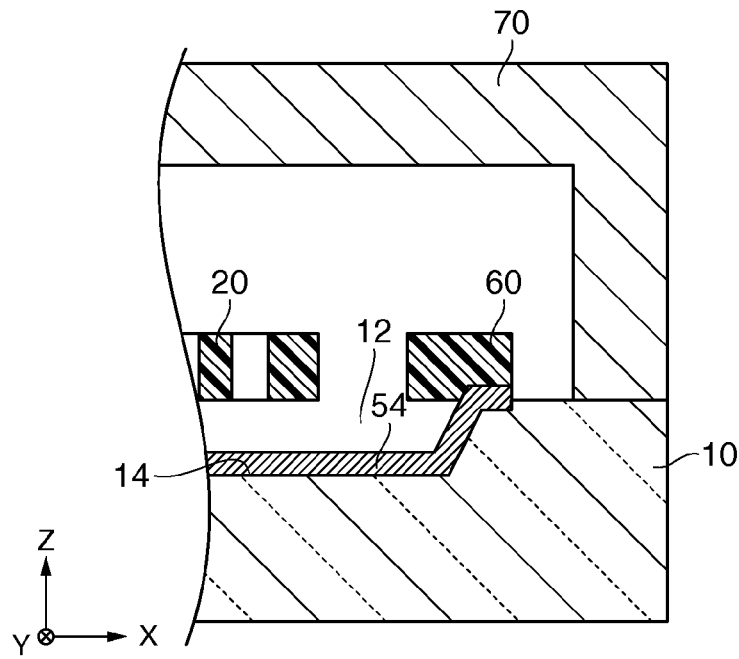
FIG. 3 is a cross-sectional view schematically illustrating the physical quantity sensor according to the exemplary embodiment.

First, a physical quantity sensor according to an exemplary embodiment of the invention will be described with reference to the accompanying drawings. FIG. 1 is a plan view schematically illustrating a physical quantity sensor 100 according to this exemplary embodiment. FIGS. 2 and 3 are cross-sectional views schematically illustrating the physical quantity sensor 100 according to this exemplary embodiment. FIG. 2 is a cross-sectional view taken along line II-II of FIG. 1 and FIG. 3 is a cross-sectional view taken along line of FIG. 1. In FIG. 1, a cover member 70 is not shown for the purpose of convenience. In FIGS. 1 to 3, an X axis, a Y axis, and a Z axis are shown as three axes perpendicular to each other.

The physical quantity sensor 100 can be used, for example, as an inertial sensor and can be specifically used, for example, as an acceleration sensor (a capacitive acceleration sensor or a capacitive MEMS acceleration sensor) for measuring acceleration in a vertical direction (Z axis direction).

As shown in FIGS. 1 and 2, the physical quantity sensor 100 includes a support substrate 10, an oscillating member 20, a protrusion 30, support portions 40 and 42, a first detection electrode 50, a second detection electrode 52, a counter electrode (electrode) 54, a frame member 60, and a cover member 70.

The first detection electrode 50, the second detection electrode 52, and the counter electrode 54 are disposed on the support substrate 10. In the example shown in the drawings, the electrodes 50, 52, and 54 are disposed on a surface 14 defining the bottom of a concave portion 12 of the support substrate 10. The frame member 60 and the cover member 70 are attached to the support substrate 10. A space for receiving the oscillating member 20 can be formed by the support substrate 10 and the cover member 70. The material of the support substrate 10 is not particularly limited, but an example thereof is glass.

The oscillating member 20 is disposed above the support substrate 10. The oscillating member 20 is supported by the first support portion 40 and the second support portion 42. For example, when acceleration in a vertical direction (Z axis direction) is applied thereto, the oscillating member 20 can seesaw-oscillate (seesaw motion) with a support axis Q determined by the support portions 40 and 42 as an oscillation axis (rotation axis).

The oscillating member 20 includes a first seesaw piece (first part) 20a and a second seesaw piece (second part) 20b. The first seesaw piece 20a is one (a part located on the right side in FIG. 1) of two parts of the oscillating member 20 defined by the support axis Q in a plan view. The second seesaw piece 20b is the other (a part located on the left side in FIG. 1) of two parts of the oscillating member 20 defined by the support axis Q in a plan view.

For example, when acceleration (for example, gravitational acceleration) in the vertical direction (the Z axis direction) is applied to the oscillating member 20, a rotational moment (moment of force) is generated in each of the first seesaw piece 20a and the second seesaw piece 20b. Here, when the rotational moment (for example, the rotational moment in a clockwise direction) of the first seesaw piece 20a and the rotational moment (for example, the rotational moment in the counterclockwise direction) of the second seesaw piece 20b are balanced, the inclination of the oscillating member 20 does not vary and thus the variation in acceleration cannot be detected. Therefore, when acceleration in the vertical direction (the Z axis direction) is applied, the oscillating member 20 is designed so that the rotational moment of the first seesaw piece 20a and the rotational moment of the second seesaw piece 20b are not balanced, thereby causing a predetermined inclination of the oscillating member 20.

In the physical quantity sensor 100, by disposing the support axis Q at a position departing from the center (the center of gravity) of the oscillating member 20 (by making the distances from the support axis Q to the tips of the seesaw pieces 20a and 20b different from each other), the seesaw pieces 20a and 20b are different in mass from each other. That is, one region (the first seesaw piece 20a) and the other region (the second seesaw piece 20b) of the oscillating member 20 with the support axis Q as a boundary are different in mass from each other. Specifically, the distance from the support axis Q to a first side face 24 of the first seesaw piece 20a is larger than the distance from the support axis Q to a second side face 25 of the second seesaw piece 20b. The thickness of the first seesaw piece 20a and the thickness of the second seesaw piece 20b are equal to each other. Therefore, the mass of the first seesaw piece 20a is larger than the mass of the second seesaw piece 20b. In this way, since the seesaw pieces 20a and 20b have different masses, it is possible not to balance the rotational moment of the first seesaw piece 20a and the rotation moment of the second seesaw piece 20b with each other when acceleration in the vertical direction (the Z axis direction) is applied thereto. Therefore, when the acceleration in the vertical direction (the Z axis direction) is applied thereto, it is possible to cause the oscillating member 20 to have a predetermined inclination.

Although not shown in the drawings, by disposing the support axis Q at the center of the oscillating member 20 and causing the seesaw pieces 20a and 20b to be different in thickness from each other, the seesaw pieces 20a and 20b may have different masses. In this case, it is also possible to cause the oscillating member 20 to have a predetermined inclination when acceleration in the vertical direction (the Z axis direction) is applied thereto.

The planar shape (the shape when seen from the Z axis direction) of the oscillating member 20 is, for example, rectangular. Specifically, the oscillating member 20 has a rectangular planar shape having a long side along the X axis and a short side along the Y axis. The first seesaw piece 20a has, for example, a rectangular planar shape having a long side along the X axis and a short side along the Y axis. The second seesaw piece 20b has, for example, a rectangular planar shape having a long side along the Y axis and a short side along the X axis. The planar shapes of the oscillating member 20 and the seesaw pieces 20a and 20b are not particularly limited.

The oscillating member 20 is disposed to be separated from the support substrate 10. In the example shown in the drawings, a gap 2 is disposed between the oscillating member 20 and the support substrate 10. The oscillating member 20 is connected to the frame member 60 with the support portions 40 and 42 so as to be separated therefrom. A gap 4 is disposed between the oscillating member 20 and the frame member 60. The oscillating member 20 can seesaw-oscillate due to the presence of the gaps 2 and 4 around the oscillating member 20.

The oscillating member 20 serves as movable electrodes 21a and 21b. The oscillating member 20 may be formed of a conductive material (such as silicon doped with impurities) to form the movable electrodes. Alternatively, the movable electrodes formed of a conductor layer of metal or the like may be formed on the surface of the oscillating member 20. In the example shown in the drawings, the movable electrodes 21a and 21b are formed by forming the oscillating member 20 out of a conductive material (silicon doped with impurities). That is, the first seesaw piece 20a serves as the movable electrode 21a and the second seesaw piece 20b serves as the movable electrode 21b.

The first detection electrode 50 is disposed at a position of the support substrate 10 opposing the movable electrode 21a. A variable capacitor C1 is constructed by the movable electrode 21a and the first detection electrode 50. The second detection electrode 52 is disposed at a position of the support substrate 10 opposing the movable electrode 21b. A variable capacitor C2 is constructed by the movable electrode 21b and the second detection electrode 52. The variable capacitor C1 and the variable capacitor C2 are constructed to have the same capacitance, for example, in a state where the oscillating member 20 is horizontal as shown in FIG. 2. The movable electrode 21a and the movable electrode 21b vary in position with the seesaw oscillation of the oscillating member 20. Accordingly, the capacitance values of the variable capacitors C1 and C2 vary. In the example shown in the drawings, since the movable electrodes 21a and 21b are formed by the oscillating member 20 itself, the movable electrodes 21a and 21b are electrodes having the same potential.

Although not shown in the drawings, the first detection electrode 50 may be disposed at the position of the cover member 70 opposing the movable electrode 21a, and the second detection electrode 52 may be disposed at the position of the cover member 70 opposing the movable electrode 21b.

A through-hole (slit) 26 passing from a top surface 28 of the oscillating member 20 to a bottom surface 29 of the oscillating member 20 is formed in the oscillating member 20. Accordingly, it is possible to reduce an influence of air (air resistance) when the oscillating member 20 oscillates. In the example shown in the drawings, plural through-holes 26 are formed.

The protrusion 30 is disposed on the side face (the first side face) 24 of the first seesaw piece 20a and the side face (the second side face) 25 of the second seesaw piece 20b. Here, the first side face 24 and the second side face 25 are a pair of faces intersecting (perpendicularly intersecting in the example shown in the drawings) the axis (the second axis) L perpendicular to the support axis (the first axis) Q in a plane. In other words, the first side face 24 and the second side face 25 are faces opposing each other with the support axis Q interposed therebetween. In the example shown in the drawings, the first side face 24 and the second side face 25 are parallel to each other. The first side face 24 and the second side face 25 are parallel to the support axis Q. The first side face 24 is, for example, a face located most apart from the support axis Q out of the faces of the first seesaw piece 20a. The second side face 25 is, for example, a face located most apart from the support axis Q out of the faces of the second seesaw piece 20b.

The protrusions 30 extend from the side faces 24 and 25 in the in-plane direction of the top surface 28 (or the bottom surface 29) of the oscillating member 20. In the example shown in the drawings, the protrusions 30 disposed on the first side face 24 extend in the +X axis direction from the first side face 24. The protrusions 30 disposed on the second side face 25 extend in the −X axis direction from the second side face 25. The protrusions 30 are, for example, portions (ends) most apart from the support axis Q in a structure (a structure seesaw-oscillating with the support axis Q as an oscillation axis) including the oscillating member 20 and the protrusions 30. Accordingly, the protrusions 30 in the structure can first come in contact with the support substrate 10 when large acceleration is applied thereto and the structure comes in contact with the support substrate 10. The protrusions 30 can serve as a stopper for limiting the motion (seesaw oscillation) of the oscillating member 20.

The planar shape of the protrusion 30 is rectangular in the example shown in the drawings. The thickness (the size in the Z axis direction in the example shown in the drawing) of the protrusion 30 is equal to the thickness (the size in the Z axis direction in the example shown in the drawing) of the oscillating member 20 (the seesaw pieces 20a and 20b).

The size in the X axis direction of the oscillating member 20 is, for example, about 1 mm, and the size in the Y axis direction of the oscillating member 20 is, for example, in a range of about 300 to 500 μm. The size in the X axis direction of the protrusion 30 is, for example, about 10 μm and the size in the Y axis direction of the protrusion 30 is, for example, about 10 μm.

The protrusions 30 are formed as a unified body along with the oscillating member 20. Specifically, the protrusions 30 and the oscillating member 20 are formed as a unified body by patterning a single substrate (a silicon substrate 201 to be described later). In the example shown in the drawings, the oscillating member 20, the protrusions 30, the supporting portions 40 and 42, and the frame member 60 are formed as a unified body.

As shown in FIG. 1, the first side face 24 is partitioned into a first region 24a and a second region 24b by the axis L. Specifically, the first side face 24 is partitioned into the first region 24a and the second region 24b by the axis L passing through the center of the width of the first side face 24 in the direction (the Y direction) parallel to the support axis (the first axis) Q. In the example shown in FIG. 1, the axis L passes through the center of the first side face 24 and the center of the second side face 25 and is perpendicular to the support axis Q in the XY plane. The first region 24a and the second region 24b are provided with the protrusions 30, respectively. In the example shown in the drawing, a single protrusion 30 is disposed in each of the first region 24a and the second region 24b, but plural protrusions 30 may be disposed in each of the regions 24a and 24b.

As shown in FIG. 1, the second side face 25 is partitioned into a third region 25a and a fourth region 25b by the axis L. Specifically, the second side face 25 is partitioned into the third region 25a and the fourth region 25b by the axis L passing through the center of the width of the second side face 25 in the direction (the Y direction) parallel to the support axis (the first axis) Q. The third region 25a and the fourth region 25b are provided with the protrusions 30, respectively. In the example shown in the drawing, a single protrusion 30 is disposed in each of the third region 25a and the fourth region 25b, but plural protrusions 30 may be disposed in each of the regions 25a and 25b. For example, the number of protrusions 30 disposed on the first side face 24 and the number of protrusions 30 disposed on the second side face 25 are equal to each other.

The first support portion 40 and the second support portion 42 support the oscillating member 20. The first support portion 40 and the second support portion 42 serve as a torsion spring (twist spring). Accordingly, the supporting portions have a restoring force resistant to torsional deformation generated in the spring due to the seesaw oscillation of the oscillating member 20 and it is possible to prevent breakage of the supporting portions.

The first support portion 40 and the second support portion 42 are arranged along the support axis Q. The first support portion 40 and the second support portion 42 are members positioning the support axis Q serving as the center of rotation (the center of oscillation) of the oscillating member 20. In the example shown in the drawing, the first support portion 40 and the second support portion 42 overlap with the support axis Q in a plan view. The first support portion 40 and the second support portion 42 extend from the frame member 60 to the oscillating member 20. The extending direction (in the Y axis direction) of the first support portion 40 and the second support portion 42 is parallel to the extending direction (the Y axis direction) of the support axis Q. The oscillating member 20 is fixed to the frame member 60 with the supporting portions 40 and 42.

The first detection electrode 50 is disposed on the support substrate 10. The first detection electrode 50 is disposed to oppose the oscillating member 20 (the movable electrode 21a). The movable electrode 21a is disposed above the first detection electrode 50 with the gap 2 interposed therebetween. The first detection electrode 50 forms a capacitor C1 along with the movable electrode 21a.

The second detection electrode 52 is disposed on the support substrate 10. The second detection electrode 52 is disposed to oppose the oscillating member 20 (the movable electrode 21b). The movable electrode 21b is disposed above the second detection electrode 52 with the gap 2 interposed therebetween. The second detection electrode 52 forms a capacitor C2 along with the movable electrode 21b. For example, the planar shape of the first detection electrode 50 and the planar shape of the second detection electrode 52 are line-symmetric about the support axis Q.

The counter electrode 54 is disposed on the support substrate 10. The counter electrode 54 is disposed outside the arrangement area of the detection electrodes 50 and 52 on the support substrate 10. The counter electrode 54 is disposed to oppose the oscillating member 20. The oscillating member 20 is located above the counter electrode 54 with the gap 2 interposed therebetween. The counter electrode 54 is formed at a position opposing the oscillating member 20 and a position other than the areas in which the detection electrodes 50 and 52 are disposed. The counter electrode 54 is electrically connected to the oscillating member 20. Specifically, as shown in FIG. 3, the counter electrode 54 is formed on the plane 14 defining the bottom of the concave portion 12, on the plane defining the side of the concave portion 12, and in the region between the frame member 60 and the support substrate 10, and is connected to the oscillating member 20 via the frame member 60 and the support portions 40 and 42. Accordingly, the counter electrode 54 may have the same potential as the oscillating member 20.

The detection electrodes 50 and 52 and the counter electrode 54 are disposed, for example, at positions not overlapping with the protrusions 30 in a plan view. The detection electrodes 50 and 52 and the counter electrode 54 are disposed, for example, to avoid the area in which the protrusions 30 come in contact with the support substrate 10.

The detection electrodes 50 and 52 and the counter electrode 54 can be formed of, for example, aluminum, gold, or ITO (Indium Tin Oxide). The detection electrodes 50 and 52 and the counter electrode 54 are preferably formed of a transparent electrode material such as ITO. By forming the detection electrodes 50 and 52 and the counter electrode 54 out of a transparent electrode material, foreign particles present on the electrodes 50, 52, and 54 can be easily viewed when the support substrate 10 is a transparent substrate (glass substrate).

The frame member 60 is disposed on the support substrate 10. The frame member 60 surrounds the oscillating member 20 and the protrusions 30 in a plan view. As shown in FIG. 1, the width of the gap 4 between the outer edge (the outer edge of a movable member including the oscillating member and the protrusions) of the oscillating member 20 and the protrusions 30 and the inner edge of the frame member 60 is constant. In processes of bonding a sensor substrate to a support substrate and etching the sensor substrate to form the oscillating member, by designing the width of the gap between the outer edge of the oscillating member and the protrusions and the inner edge of the frame member to be constant, it is possible to form the oscillating member and the protrusions through the use of a single etching process, thereby improving the manufacturing efficiency. That is, the width of the gap 4 is an etching removal width in the process of patterning a silicon substrate 201 (sensor substrate) shown in FIG. 8 into a desired shape to form the oscillating member.

In the example shown in FIG. 1, concave portions 62 are formed on the side face of the frame member 60 opposing the protrusion 30. The concave portion 62 is a depressed portion formed on the side face of the frame member 60. By forming the concave portions 62 in the frame member 60, for example, the size 4a of the gap 4 between the oscillating member 20 (the first side face 24) and the frame member 60 and the size 4b of the gap 4 between the protrusions 30 and the frame member 60 can be made to be equal to each other. Accordingly, when a single substrate (a silicon substrate 201 to be described later) is etched to form the oscillating member 20 and the protrusions 30, it is possible to enhance processing precision. The sizes 4a and 4b of the gaps 4 are, for example, in a range of about 4 to 5 µm. It is also possible to reduce the size of the sensor, compared with a case in which the concave portions are not formed. The concave portion 62 has a rectangular planar shape corresponding to the planar shape of the protrusion 30. The material of the frame member 60 is, for example, the same as the material of the oscillating member 20.

The cover member 70 is placed on the support substrate 10. For example, a silicon substrate (substrate formed of silicon) can be used as the cover member 70. When a glass substrate is used as the support substrate 10, the support substrate 10 and the cover member 70 may be bonded to each other through anodic bonding.

Figure 4A:
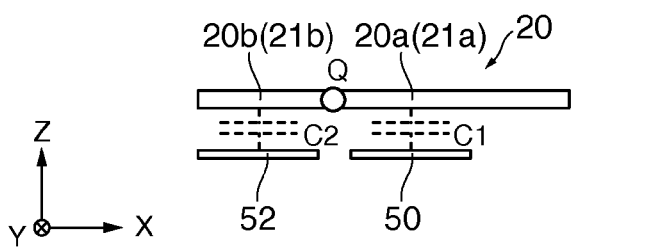
FIGS. 4A, 4B, and 4C are diagrams illustrating the motion of an oscillating member and a variation in capacitance of variable capacitors.
Figure 4B:
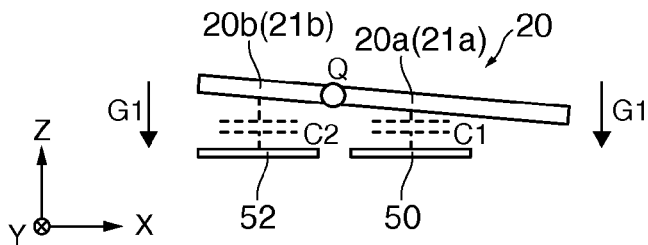
Figure 4C:
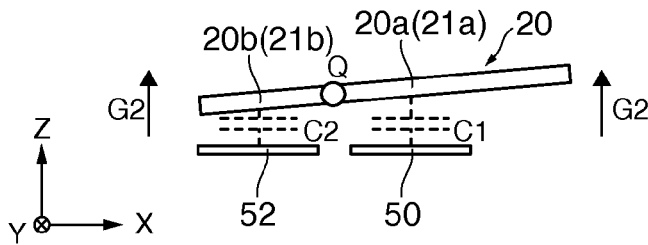

The motion of the oscillating member 20 and a variation in capacitance of the variable capacitors C1 and C2 due to the motion will be described below. FIGS. 4A, 4B, and 4C are diagrams illustrating the motion of the oscillating member 20 and the variation in capacitance of the variable capacitors C1 and C2.

In FIG. 4A, the oscillating member 20 maintains a horizontal state (which corresponds to a state without gravitational acceleration (zero-gravity state)). The distance between the support axis Q and the tip of the first seesaw piece 20a is larger than the distance between the support axis Q and the tip of the second seesaw piece 20b. Accordingly, in the state shown in FIG. 4A, for example, when acceleration in the vertical downward direction (−Z axis direction) is applied thereto, the rotational moment acting on the first seesaw piece 20a is larger than the rotational moment acting on the second seesaw piece 20b, and the oscillating member 20 rotates in the clockwise direction. Here, it is assumed that the protrusions 30 do not affect the motion of the oscillating member 20. Accordingly, in FIGS. 4A, 4B, and 4C, the protrusions 30 are not shown.

In the state shown in FIG. 4B, for example, gravitational acceleration G1 (=1 G) is applied to the oscillating member 20. Accordingly, the oscillating member 20 rotates in the clockwise direction and the oscillating member 20 is inclined. By this seesaw oscillation of the oscillating member 20, the distance between the movable electrode 21a and the first detection electrode 50 decreases and the capacitance of the variable capacitor C1 increases as a result. On the other hand, the distance between the movable electrode 21b and the second detection electrode 52 increases and the capacitance of the variable capacitor C2 decreases as a result. In the physical quantity sensor 100, it is possible to detect the magnitude and the direction of acceleration using two detection signals (differential signals) representing the variations in capacitance of the variable capacitors C1 and C2. Specifically, it is possible to detect the value (=1 G) of the gravitational acceleration G1 from the degrees of variation of the two detection signals. It is also possible to specify the direction (the vertical downward direction, the −Z axis direction) of the acceleration from the directions of the variations of the two detection signals.

In the state shown in FIG. 4C, acceleration G2 in the vertical upward direction (+Z axis direction) is additionally applied to the oscillating member 20 in a state where the gravitational acceleration G1 (=1 G) is applied to the oscillating member 20. In this case, the oscillating member 20 rotates in the counterclockwise direction and the oscillating member 20 is inclined in the opposite direction of the inclination shown in FIG. 4B. Due to the seesaw oscillation of the oscillating member 20, the distance between the movable electrode 21a and the first detection electrode 50 increases and the capacitance of the variable capacitor C1 decreases as a result. On the other hand, the distance between the movable electrode 21b and the second detection electrode 52 decreases and the capacitance of the capacitor C2 increases as a result.

By determining the detection signals in the state shown in FIG. 4C on the basis of the detection signals (that is, the magnitude and direction of the gravitational acceleration) obtained in the state shown in FIG. 4B, it is possible to detect the magnitude and direction of the acceleration acting in the state shown in FIG. 4C. That is, on the basis of two detection signals obtained in the state shown in FIG. 4C, it is possible to detect the value of the applied acceleration G2 from the degrees of variation of the two detection signals. It is also possible to specify the direction (the vertical upward direction, the +Z axis direction) of the acceleration G2 from the directions of the variations of the two detection signals.

As described above, the physical quantity sensor 100 can be used as an inertial sensor such as an acceleration sensor or a gyro sensor, and can be specifically used, for example, as a capacitive acceleration sensor for measuring acceleration in the vertical direction (the Z axis direction).

The physical quantity sensor 100 according to this exemplary embodiment has, for example, the following features.

In the physical quantity sensor 100, the side faces 24 and 25 of the oscillating member 20 are provided with the protrusions 30. Accordingly, when large acceleration is applied, it is possible to prevent the oscillating member 20 (the movable electrodes 21a and 21b) from colliding with the support substrate 10. Therefore, it is possible to prevent damage to the oscillating member (the movable electrodes), thereby enhancing reliability. Compared with a case where the protrusions are not provided (a case where the oscillating member and the support substrate come in direct contact with each other), it is possible to reduce the contact area with the support substrate 10. As a result, it is possible to prevent the oscillating member from sticking to the support substrate.

Since the protrusions 30 are disposed on the side faces 24 and 25 of the oscillating member 20, the oscillating member 20 and the protrusions 30 can be formed, for example, by patterning a single substrate (a silicon substrate 201 to be described later). Accordingly, it is possible to simplify the manufacturing processes.

In the physical quantity sensor 100, the counter electrode 54 is electrically connected to the oscillating member 20. Accordingly, it is possible to set the oscillating member 20 and the counter electrode 54 to the same potential, and it is possible to prevent the oscillating member 20 from sticking to the support substrate 10 due to the potential difference between the oscillating member 20 and the support substrate 10.

In the physical quantity sensor 100, the protrusions 30 do not overlap with the detection electrodes 50 and 52 and the counter electrode 54 in a plan view. Accordingly, when the protrusions 30 collide with the support substrate 10, it is possible to prevent damage to the detection electrodes 50 and 52 and the counter electrode 54.

In the physical quantity sensor 100, the protrusions 30 are formed as a unified body with the oscillating member 20. That is, the protrusions 30 and the oscillating member 20 can be formed by patterning a single substrate. Therefore, it is possible to simplify the manufacturing processes.

In the physical quantity sensor 100, the first region 24a and the second region 24b of the first side face 24 are provided with at least one protrusion 30. Accordingly, it is possible to more satisfactorily prevent the oscillating member 20 from colliding with the support substrate 10.

In the physical quantity sensor 100, the width of the gap 4 between the outer edge of the oscillating member 20 and the protrusions 30 and the inner edge of the frame member 60 is constant. Accordingly, in the processes of bonding a sensor substrate to a support substrate and etching the sensor substrate to form the oscillating member, by designing the width of the gap between the outer edge of the oscillating member and the protrusions and the inner edge of the frame member to be constant, it is possible to form the oscillating member and the protrusions through the use of a single etching process, thereby improving the manufacturing efficiency.

The physical quantity sensor 100 includes the frame member 60 and the concave portions 62 are formed on the side face of the frame member 60 opposing the protrusions 30. Accordingly, the size 4a of the gap 4 between the oscillating member 20 (the first side face 24) and the frame member 60 and the size 4b of the gap 4 between the protrusions 30 and the frame member 60 can be made to be equal to each other. Therefore, it is possible to enhance the processing precision when a single substrate is etched to form the oscillating member 20 and the protrusions 30. For example, when the size of the gap between the oscillating member (the first side face) and the frame member is larger than the size of the gap between the protrusions and the frame member, the region having the larger gap size may be first etched in the process of etching the substrate to form the oscillating member and the protrusions, and thus the shapes of the oscillating member and the protrusions may be low in precision. According to the physical quantity sensor 100, such a problem can be prevented. By forming the concave portions 62 on the side face of the frame member 60, it is possible to reduce the size of the sensor, compared with a case where the concave portions are not formed in the frame member.

2. Method of Manufacturing Physical Quantity Sensor

A method of manufacturing the physical quantity sensor according to this exemplary embodiment will be described below with reference to the accompanying drawings. FIGS. 5 to 8 are cross-sectional views schematically illustrating the processes of manufacturing the physical quantity sensor 100 according to this exemplary embodiment.

Figure 5:
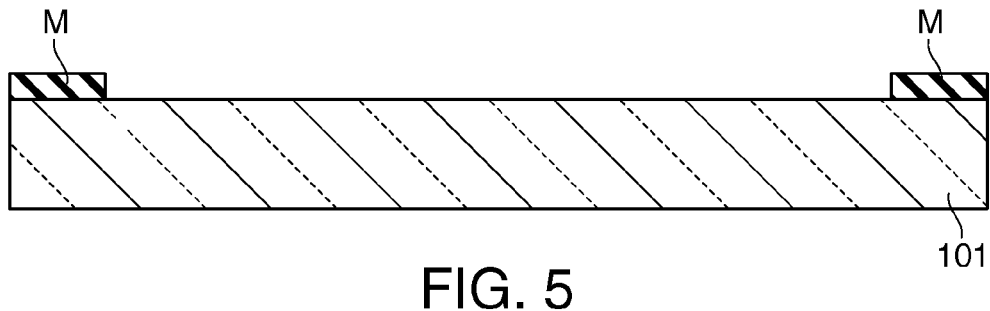
FIG. 5 is a cross-sectional view schematically illustrating a process of manufacturing the physical quantity sensor according to the exemplary embodiment.

As shown in FIG. 5, for example, a mask M is formed on a glass substrate 101. The mask M is formed by forming an insulating layer on the glass substrate 101, for example, using a sputtering method or a coating method and then patterning the insulating layer in a predetermined shape.

Figure 6:
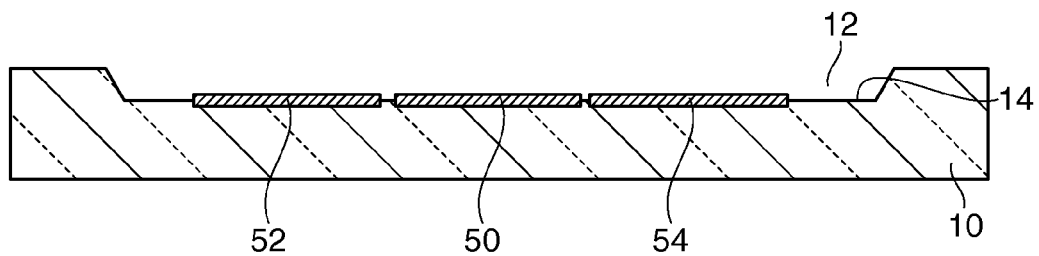
FIG. 6 is a cross-sectional view schematically illustrating a process of manufacturing the physical quantity sensor according to the exemplary embodiment.

As shown in FIG. 6, the glass substrate 101 is wet-etched using the mask M as a mask to form a concave portion 12. Accordingly, the support substrate 10 can be formed. The first detection electrode 50, the second detection electrode 52, and the counter electrode 54 are formed on the plane 14 defining the bottom of the concave portion 12. The electrodes 50, 52, and 54 are formed by forming a conductive layer on the plane 14 of the support substrate 10 using a sputtering method or the like and then patterning the conductive layer using photolithographic techniques and etching techniques.

Figure 7:
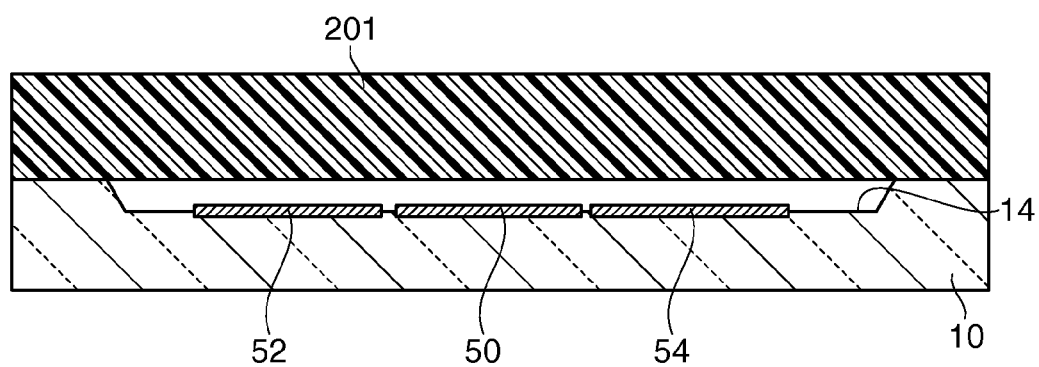
FIG. 7 is a cross-sectional view schematically illustrating a process of manufacturing the physical quantity sensor according to the exemplary embodiment.

As shown in FIG. 7, the silicon substrate 201 (the sensor substrate) is bonded to the support substrate 10. The bonding of the support substrate 10 and the silicon substrate 201 is performed, for example, using anodic bonding, direct bonding, or an adhesive.

Figure 8:
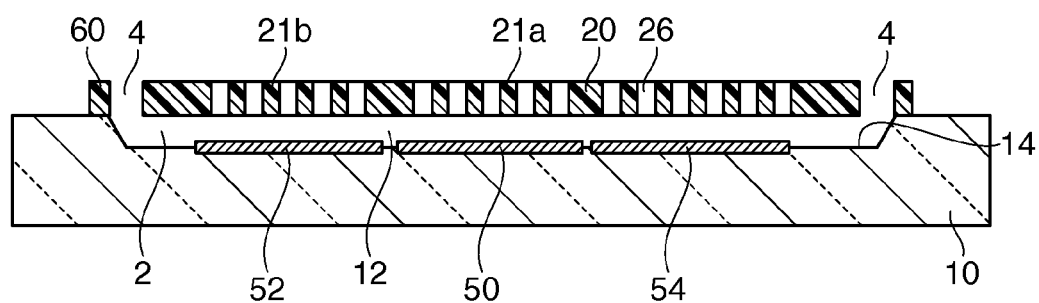
FIG. 8 is a cross-sectional view schematically illustrating a process of manufacturing the physical quantity sensor according to the exemplary embodiment.

As shown in FIG. 8, the silicon substrate 201 is ground, for example, with a grinder to reduce the thickness thereof, and is then patterned in a desired shape to form the oscillating member 20, the protrusions 30, the support portions 40 and 42, and the frame member 60. The patterning is performed using photolithographic techniques and etching techniques (dry etching). A Bosch method can be used as a specific etching technique. In this process, by patterning (etching) the silicon substrate 201, the oscillating member 20, the protrusions 30, the support portions 40 and 42, and the frame member 60 are formed as a unified body. In this process, by designing the width of the gap 4 between the outer edge of the oscillating member 20 and the protrusions 30 and the inner edge of the frame member 60 to be constant, it is possible to form the oscillating member 20 and the protrusions 30 through the use of a single etching process, thereby improving the manufacturing efficiency. Since the concave portions 62 (see FIG. 1)

are formed in the frame member 60, it is possible to precisely form the protrusions 30 and the oscillating member 20.

As shown in FIGS. 1 and 2, the cover member 70 is bonded to the support substrate 10 and the oscillating member 20 is received in a space formed by the support substrate 10 and the cover member 70. The bonding of the support substrate 10 and the cover member 70 is performed, for example, using anodic bonding or an adhesive.

Through the above-mentioned processes, it is possible to manufacture the physical quantity sensor 100.

The method of manufacturing the physical quantity sensor 100 according to this exemplary embodiment has, for example, the following features.

According to the method of manufacturing the physical quantity sensor 100, the protrusions 30 and the oscillating member 20 can be formed through the same process by etching the silicon substrate 201. Therefore, it is possible to simplify the manufacturing processes.

According to the method of manufacturing the physical quantity sensor 100, since the protrusions 30 are formed in the oscillating member 20, it is possible to prevent the oscillating member 20 from sticking to the support substrate 10 in the manufacturing processes. For example, when the protrusions are not formed, the contact area of the oscillating member and the support substrate is large and thus the oscillating member can easily stick to the support substrate. On the contrary, in the physical quantity sensor 100, since the protrusions 30 are formed in the oscillating member 20, the contact area with the support substrate can decrease and thus the oscillating member 20 hardly sticks to the support substrate 10.

According to the method of manufacturing the physical quantity sensor 100, since the counter electrode 54 is provided, the oscillating member 20 and the counter electrode 54 can be set to the same potential and it is thus possible to prevent the oscillating member 20 from sticking to the support substrate 10 due to the potential difference between the oscillating member 20 and the support substrate 10 in the manufacturing processes.

Figure 9:
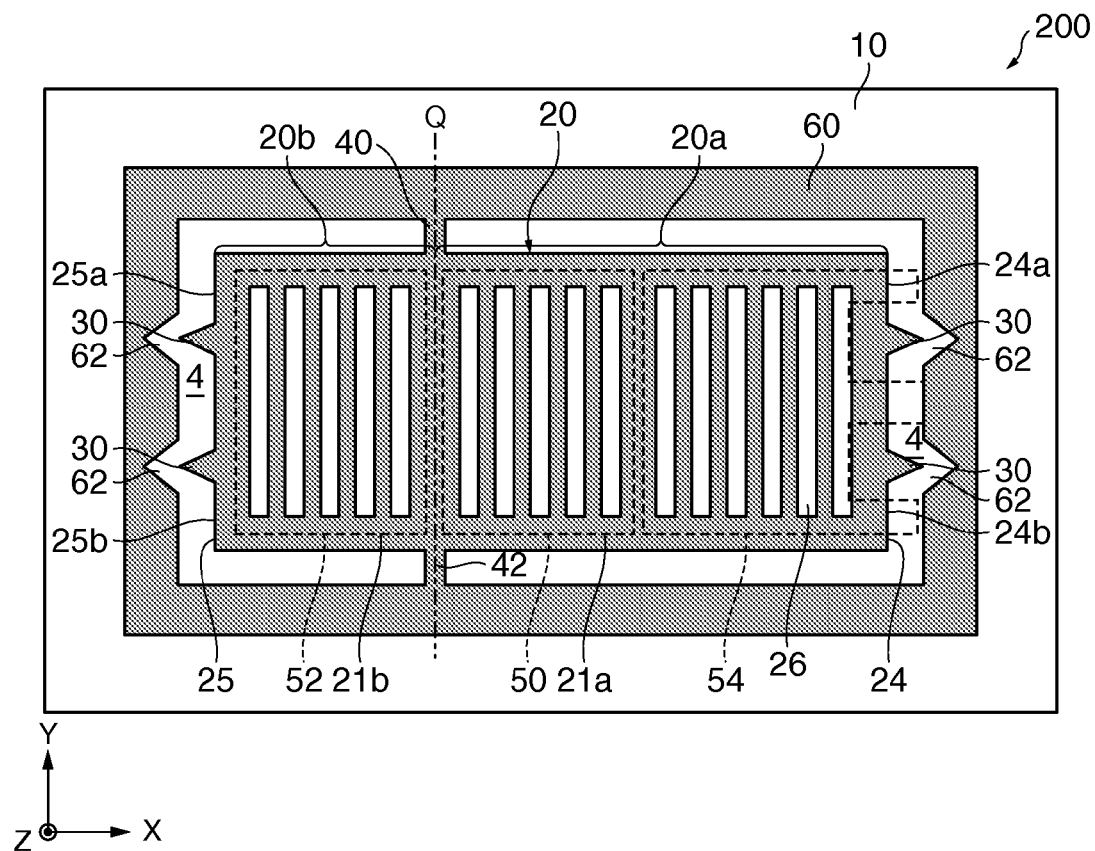
FIG. 9 is a plan view schematically illustrating a physical quantity sensor according to a first modification example of the exemplary embodiment.

3. Modification Example of Physical Quantity Sensor i. First Modification Example First, a physical quantity sensor according to a first modification example of this exemplary embodiment will be described with reference to the accompanying drawings. FIG. 9 is a plan view schematically illustrating a physical quantity sensor 200 according to the first modification example of this exemplary embodiment. In the physical quantity sensor 200 according to the first modification example of this exemplary embodiment, elements having the same functions as the constituent elements of the physical quantity sensor 100 according to this exemplary embodiment will be referenced by the same reference numerals and detailed description thereof will not be repeated.

In the example of the physical quantity sensor 100, as shown in FIG. 1, the protrusions 30 have a rectangular planar shape. On the contrary, in the physical quantity sensor 200, the protrusions 30 have a planar shape having a sharp-pointed tip. In the example shown in FIG. 9, the planar shape of the protrusions 30 is triangular. Accordingly, the contact area of the protrusions 30 and the support substrate 10 can be more reduced. Therefore, it is possible to more satisfactorily prevent the oscillating member 20 (the protrusions 30) from sticking to the support substrate 10. In the example shown in the drawing, the protrusions 30 are formed so that the vertex of a triangle is located at the tip of each protrusion 30.

In the physical quantity sensor 200, the planar shape of the concave portions 62 formed in the frame member 60 is a triangular shape corresponding to the planar shape of the protrusions 30.

ii. Second Modification Example

A physical quantity sensor according to a second modification example of this exemplary embodiment will be described below with reference to the accompanying drawings.

Figure 10:
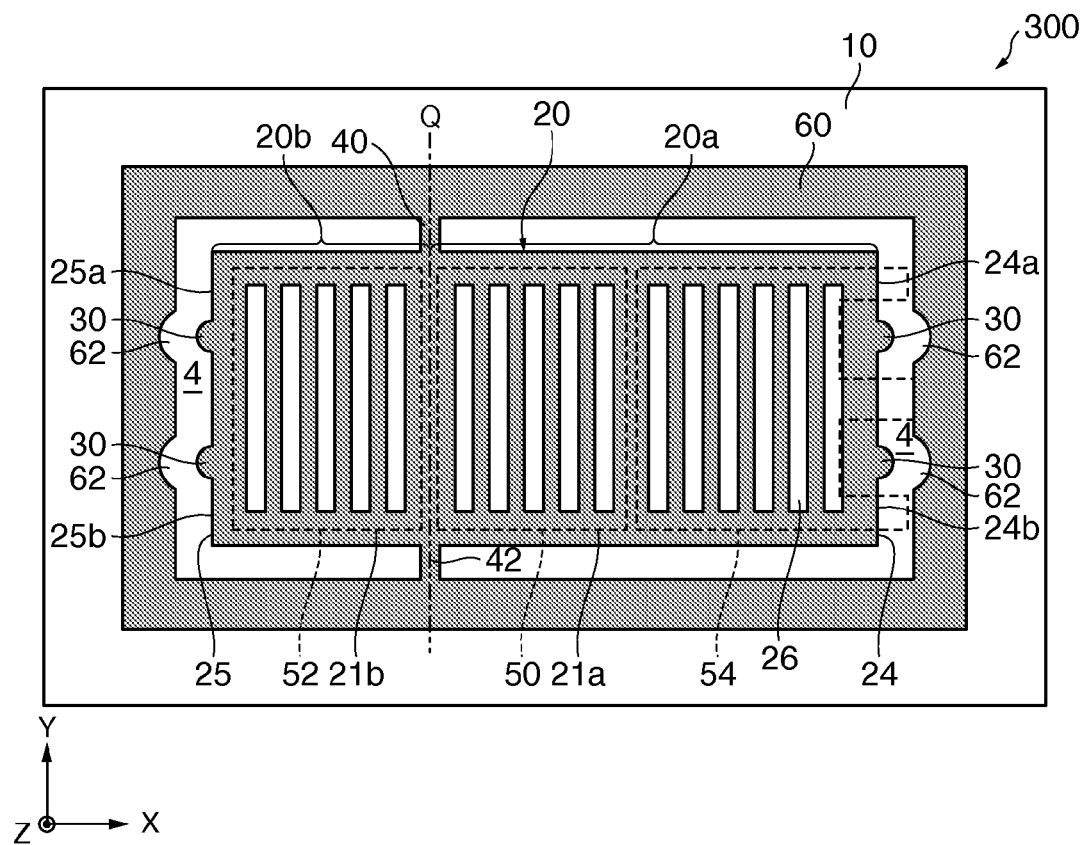
FIG. 10 is a plan view schematically illustrating a physical quantity sensor according to a second modification example of the exemplary embodiment.

FIG. 10 is a plan view schematically illustrating a physical quantity sensor 300 according to the second modification example of this exemplary embodiment. In the physical quantity sensor 300 according to the second modification example of this exemplary embodiment, elements having the same functions as the constituent elements of the physical quantity sensor 100 according to this exemplary embodiment will be referenced by the same reference numerals and detailed description thereof will not be repeated.

In the example of the physical quantity sensor 100, as shown in FIG. 1, the protrusions 30 have a rectangular planar shape. On the contrary, in the physical quantity sensor 300, the protrusions 30 have a planar shape having an arc-like tip. In the example shown in FIG. 10, the planar shape of the protrusions 30 is semi-circular. Accordingly, the contact area of the protrusions 30 and the support substrate 10 can be more reduced. Therefore, it is possible to more satisfactorily prevent the oscillating member 20 (the protrusions 30) from sticking to the support substrate 10.

In the physical quantity sensor 300, the planar shape of the concave portions 62 formed in the frame member 60 is a semi-circular shape corresponding to the planar shape of the protrusions 30.

4. Electronic Apparatus

An electronic apparatus according to this exemplary embodiment will be described below with reference to the accompanying drawings. The electronic apparatus according to this exemplary embodiment includes the physical quantity sensor according to the embodiment of the invention. Hereinafter, electronic apparatuses including the physical quantity sensor 100 as the physical quantity sensor according to the embodiment of the invention will be described.

Figure 11:
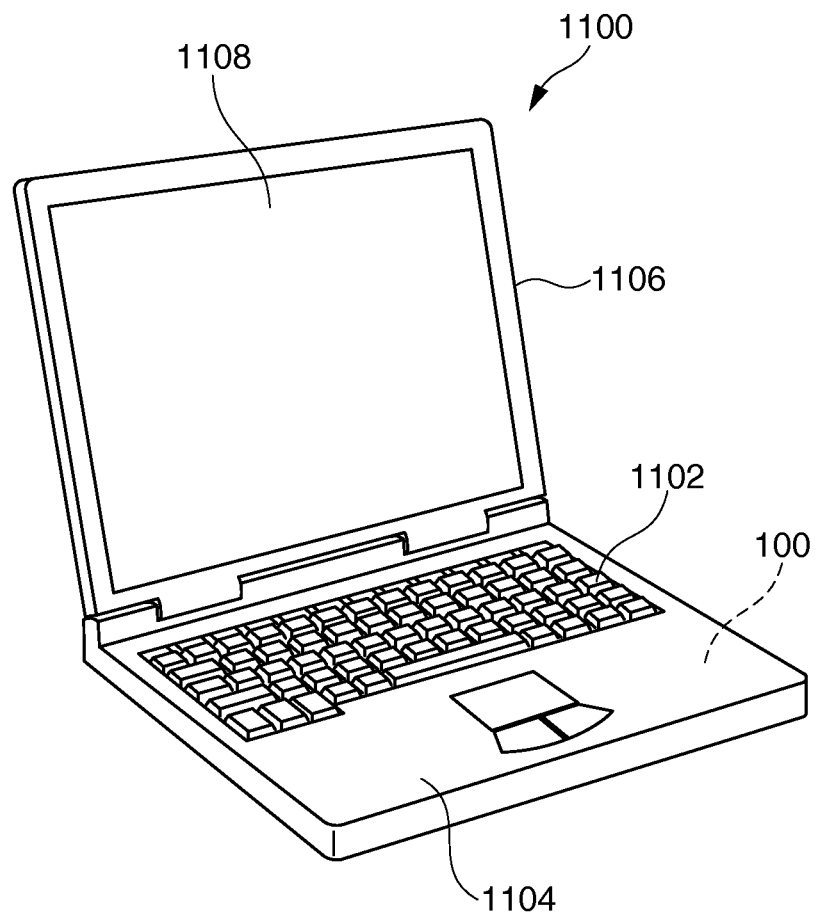
FIG. 11 is a perspective view schematically illustrating an electronic apparatus according to an exemplary embodiment of the invention.

FIG. 11 is a perspective view schematically illustrating a mobile (or notebook) personal computer 1100 as the electronic apparatus according to this exemplary embodiment.

As shown in FIG. 11, the personal computer 1100 includes a main body 1104 having a keyboard 1102 and a display unit 1106 having a display 1108. The display unit 1106 is rotatably supported by the main body 1104 with a hinge structure interposed therebetween.

The personal computer 1100 has the physical quantity sensor 100 built therein.

Figure 12:
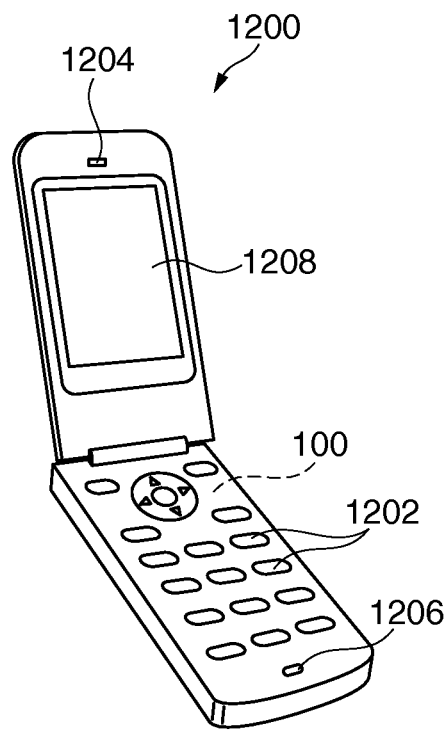
FIG. 12 is a perspective view schematically illustrating an electronic apparatus according to an exemplary embodiment of the invention.

FIG. 12 is a perspective view schematically illustrating a mobile phone (including PHS) 1200 as the electronic apparatus according to this exemplary embodiment.

As shown in FIG. 12, the mobile phone 1200 includes plural operation buttons 1202, an ear piece 1204, and a mouthpiece 1206. A display unit 1208 is disposed between the operation buttons 1202 and the ear piece 1204.

The mobile phone 1200 has the physical quantity sensor 100 built therein.

Figure 13:
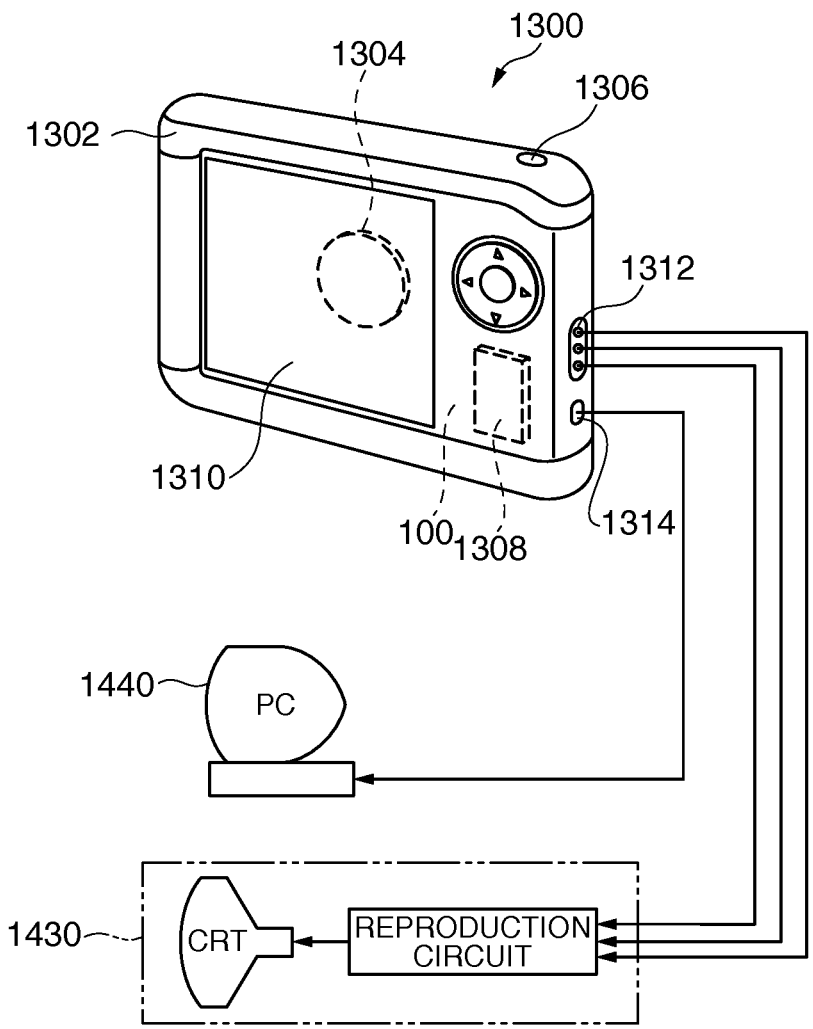
FIG. 13 is a perspective view schematically illustrating an electronic apparatus according to an exemplary embodiment of the invention.

FIG. 13 is a perspective view schematically illustrating a digital still camera 1300 as the electronic apparatus according to this exemplary embodiment. Connections to external devices are simply shown in FIG. 13.

Here, a typical camera exposes a silver halide film to an optical image of a subject, but the digital still camera 1300 photoelectrically converts an optical image of a subject by the use of an imaging device such as a CCD (Charge Coupled Device) to generate an imaging signal (image signal).

A display unit 1310 is disposed on the back surface of a case (body) 1302 of the digital still camera 1300, and displays an image based on the imaging signal from the CCD. The display unit 1310 serves as a finder displaying a subject as an electronic image.

A light-receiving unit 1304 including an optical lens (imaging optical system) or a CCD is disposed on the front surface (on the rear side in the drawing) of the case 1302.

When a photographer checks a subject image displayed on the display unit 1310 and presses a shutter button 1306, an imaging signal from the CCD at that time is transmitted to and stored in a memory 1308.

In the digital still camera 1300, a video signal output terminal 1312 and a data-communication input and output terminal 1314 are disposed on the side face of the case 1302. A television monitor 1430 is connected to the video signal output terminal 1312 and a personal computer 1440 is connected to the data-communication input and output terminal 1314, if necessary. An imaging signal stored in the memory 1308 is output to the television monitor 1430 or the personal computer 1440 by a predetermined operation.

The digital still camera 1300 has the physical quantity sensor 100 built therein.

The above-mentioned electronic apparatuses 1100, 1200, and 1300 include the physical quantity sensor 100 which can simplify the manufacturing processes thereof and which has high reliability. Accordingly, the electronic apparatuses 1100, 1200, and 1300 can simplify the manufacturing processes thereof and can have high reliability.

In addition to the personal computer (mobile personal computer) shown in FIG. 11, the mobile phone shown in FIG. 12, and the digital still camera shown in FIG. 13, examples of the electronic apparatus having the physical quantity sensor 100 include an ink jet ejection apparatus (for example, an ink jet printer), a lap-top personal computer, a television, a video camera, a video tape recorder, various navigation apparatuses, a pager, an electronic pocketbook (having a communication function), an electronic dictionary, an electronic calculator, an electronic game machine, a word processor, a work station, a television phone, a security television monitor, an electronic binocular telescope, a POS terminal, medical instruments (such as an electronic thermometer, a sphygmomanometer, a blood glucose monitoring system, an electrocardiogram measuring system, an ultrasonic diagnosis apparatus, and an electronic endoscope), a fish finder, various measuring instruments, meters and gauges (such as meters and gauges of vehicles, airplanes, and ships), and a flight simulator.

The above-mentioned exemplary embodiments and modification examples are only examples, and the invention is not limited to them. For example, the exemplary embodiments and the modification examples may be appropriately combined.

The invention includes substantially the same configuration (such as a configuration having the same function, method, and result or a configuration having the same purpose and advantages) as the configurations described in the exemplary embodiment. The invention includes a configuration in which a non-essential element of the configuration described in the exemplary embodiment is replaced. The invention includes a configuration exhibiting the same operational advantages as the configuration described in the exemplary embodiment or a configuration capable of achieving the same purpose. The invention includes a configuration in which known techniques are added to the configuration described in the exemplary embodiment.

The entire disclosure of Japanese Patent Application No. 2012-016240, filed Jan. 30, 2012 is expressly incorporated by reference herein.

What is claimed is:

1. A physical quantity sensor comprising:
a substrate;
an oscillating member that is disposed over the substrate;
a support portion that supports the oscillating member and that is disposed along a first axis; and
a detection electrode that is disposed on the substrate and that is disposed to oppose the oscillating member,
wherein the oscillating member has a side face intersecting a second axis perpendicular to the first axis in a plane, and
wherein a protrusion protruding in the plane is formed on at least a part of the side face.

2. The physical quantity sensor according to claim 1, further comprising an electrode that is disposed outside the arrangement area of the detection electrode on the substrate and that opposes the oscillating member,
wherein the electrode is electrically connected to the oscillating member.

3. The physical quantity sensor according to claim 2, wherein the protrusion does not overlap with the detection electrode and the electrode when seen in a plan view.

4. The physical quantity sensor according to claim 1, wherein the planar shape of the protrusion has a sharp-pointed tip.

5. The physical quantity sensor according to claim 1, wherein the planar shape of the protrusion is semicircular.

6. The physical quantity sensor according to claim 1, wherein the protrusion is formed as a unified body along with the oscillating member.

7. The physical quantity sensor according to claim 1, wherein the oscillating member has a rectangular planar shape and includes a first side face and a second side face intersecting the second axis, and
wherein when the first side face is partitioned into a first region and a second region by the second axis passing through the center of the width in the first axis direction of the first side face, the protrusion is disposed in each of the first region and the second region.

8. The physical quantity sensor according to claim 1, wherein a frame member is disposed around the oscillating member,
wherein the oscillating member is connected to the frame member with the support portion therebetween so as to be separated from the frame member, and
wherein the width of a gap between the outer edge of the oscillating member and the protrusion and the inner edge of the frame member is constant.

9. The physical quantity sensor according to claim 1, wherein one region and the other region into which the oscillating member is partitioned by the first axis are different in mass from each other.

10. The physical quantity sensor according to claim 9, wherein the detection electrode includes a first detection electrode that is disposed at a position opposing the one region of the oscillating member and a second detection electrode that is disposed at a position opposing the other region of the oscillating member.

11. An electronic apparatus comprising a physical quantity sensor including: a substrate; an oscillating member that is disposed over the substrate; a support portion that supports the oscillating member and that is disposed along a first axis; and a detection electrode that is disposed on the substrate and that is disposed to oppose the oscillating member, wherein the oscillating member has a side face intersecting a second axis perpendicular to the first axis in a plane, and wherein a protrusion protruding in the plane is formed on at least a part of the side face.

* * * * *